United States Patent
Celebioglu et al.

(10) Patent No.: US 12,307,300 B2
(45) Date of Patent: May 20, 2025

(54) SYSTEM AND METHOD FOR METADATA-INFORMED CONTAINER DEPLOYMENT

(71) Applicant: Dell Products L.P., Round Rock, TX (US)

(72) Inventors: Onur Celebioglu, Austin, TX (US); John A. Lockman, III, Granite Shoals, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 567 days.

(21) Appl. No.: 17/575,366

(22) Filed: Jan. 13, 2022

(65) Prior Publication Data

US 2023/0222008 A1    Jul. 13, 2023

(51) Int. Cl.
*G06F 9/50* (2006.01)

(52) U.S. Cl.
CPC ............ *G06F 9/505* (2013.01); *G06F 9/5083* (2013.01)

(58) Field of Classification Search
CPC .............................. G06F 9/5083; G06F 9/505
See application file for complete search history.

(56) References Cited

U.S. PATENT DOCUMENTS

| | | |
|---|---|---|
| 6,442,564 B1 | 8/2002 | Frey et al. |
| 10,970,113 B1* | 4/2021 | Kurtzer ................. G06F 9/5005 |
| 11,487,591 B1* | 11/2022 | Featonby ............ G06F 9/45558 |
| 2011/0126275 A1 | 5/2011 | Anderson et al. |
| 2016/0050294 A1 | 2/2016 | Kruse |
| 2017/0177877 A1* | 6/2017 | Suarez ................. G06F 21/6218 |
| 2018/0150330 A1 | 5/2018 | Bernat et al. |
| 2019/0004865 A1* | 1/2019 | Ivanov ................ G06F 9/44536 |
| 2019/0347121 A1* | 11/2019 | Luo ........................ G06F 9/542 |
| 2019/0354389 A1* | 11/2019 | Du ...................... G06F 9/45545 |

(Continued)

OTHER PUBLICATIONS

Gkikopoulos, Panagiotis & Schiavoni, Valerio & Spillner, Josef. (Jun. 9, 2021). Analysis and Improvement of Heterogeneous Hardware Support in Docker Images. In: Matos M., Greve F. (eds) Distributed Applications and Interoperable Systems. DAIS 2021. Lecture Notes in Computer Science, vol. 12718. Springer, Cham. https://doi.org/10.1007/978-3-030-78198-9_9.

(Continued)

*Primary Examiner* — Jacob D Dascomb
(74) *Attorney, Agent, or Firm* — WOMBLE BOND DICKINSON (US) LLP

(57) ABSTRACT

Methods and systems for managing the performance of workloads in a distributed system are disclosed. The distributed system may include any number of clients and deployments where workloads may be performed. The deployments may include different hardware resources, may have different levels of performance, and/or may have other different characteristics that may impact performance of a given workload using any of the deployments. To service the workloads, container instances may be deployed to various deployments. When deciding where to deploy the container instances, the hardware resources of the deployments and/or resource expectations associated with the container instances may be taken into account. By doing so, container instances may be more likely to be deployed to deployments that meet their resource expectations.

20 Claims, 10 Drawing Sheets

(56) References Cited

U.S. PATENT DOCUMENTS

| | | | |
|---|---|---|---|
| 2019/0354403 A1 | 11/2019 | Ayyagari et al. | |
| 2021/0034423 A1 | 2/2021 | Hallur et al. | |
| 2022/0124009 A1 | 4/2022 | Metsch et al. | |
| 2022/0188172 A1* | 6/2022 | Gupta | G06F 9/5044 |
| 2022/0317982 A1 | 10/2022 | Knoulich | |
| 2022/0374267 A1* | 11/2022 | Katyal | G06F 9/505 |
| 2022/0382583 A1* | 12/2022 | Dumba | G06F 9/4881 |

OTHER PUBLICATIONS

"Getting Started with Docker," Web page <https://www.docker.com/get-started>, 1 page, Dec. 31, 2021, retrieved from Internet Archive Wayback Machine <http://web.archive.org/web/20211231094517/https://www.docker.com/get-started> on Jan. 20, 2022.

* cited by examiner

SYSTEM AND METHOD FOR METADATA-INFORMED CONTAINER DEPLOYMENT

FIELD OF THE DISCLOSURE

Embodiments of the present disclosure relate generally to workload management. More particularly, embodiments of the disclosure relate to systems and methods for servicing workload requests using container instances.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
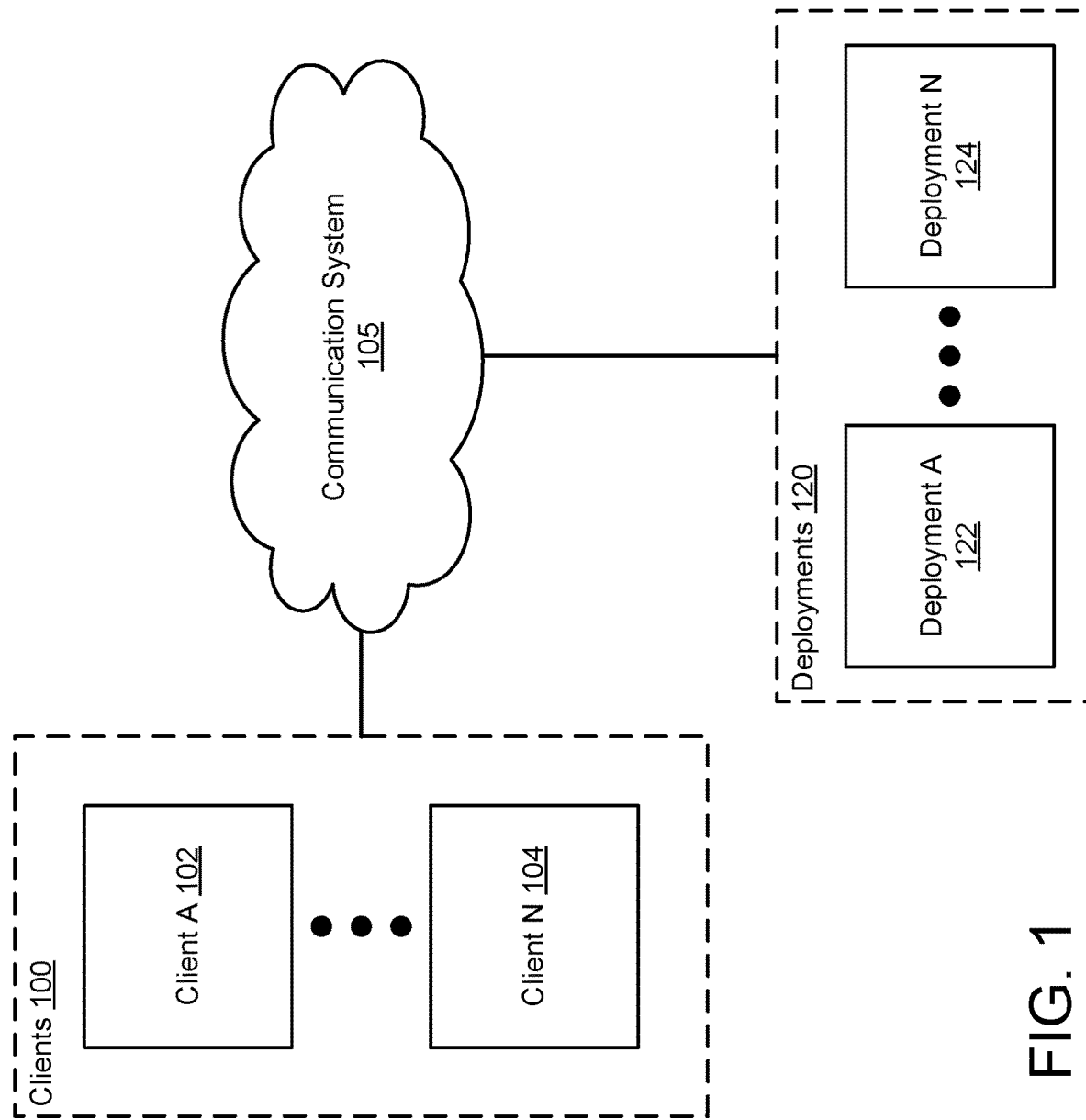
FIG. 1 shows a block diagram illustrating a system in accordance with an embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments disclosed herein. However, in certain instances, well-known or conventional details are not described in order to provide a concise discussion of embodiments of the disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the performance of workloads in a distributed system. The distributed system may include any number of clients and deployments where workloads may be performed. The deployments may include different hardware resources, may have different levels of performance, and/or may have other different characteristics that may impact performance of a given workload using any of the deployments To service the workloads, container instances may be deployed to various deployments. When deciding where to deploy the container instances, the hardware resources of the deployments and/or resource expectations associated with the container instances may be taken into account. By doing so, container instances may be more likely to be deployed to deployments that meet their resource expectations.

To identify the resource expectations of the container instances, metadata embedded in layers of build files (e.g., resource specific build files) corresponding to the container instances may be read. The read metadata may indicate the expected performance of corresponding container instances when hosted by deployments having different types and quantities of hardware resources (e.g., processors, memory modules, storage devices, etc.).

To compare different deployment locations to one another, an objective function may be utilized. The objective function may output a numerical value for any number of deployment locations that may allow for the deployment locations to be ranked with respect to one another. The best ranked deployment location may be selected to host a container instance which will perform the workload.

By doing so, embodiments disclosed herein may provide an improved system that more efficiently marshals limited computing resources for workload performance. For example, the improved system may select the workload deployment location without user intervention thereby decreasing a cognitive burden on user of the system and improving deployment location selection. Consequently, additional workloads may be concurrently performed, the workloads may be performed more quickly, and/or other benefits may be obtained.

In an embodiment, a computer-implemented method for managing workloads to be performed using deployments is disclosed. The method may include obtaining a new workload request for a workload to be performed with a data processing system of the deployments; obtaining resource expectations for the workload using a resource specific build file corresponding to the workload; obtaining performance attributes for each of the deployments; obtaining resource expenditure estimates for placing the workload at each of the deployments; selecting one of the deployments using an objective function, the resource expectations, the performance attributes, and the resource expenditures estimates; and deploying a container instance associated with the resource specific build file to the selected one of the deployments to service the workload request.

Obtaining the resource expectations for the workload using the resource specific build file corresponding to the workload may include reading embedded metadata corresponding to each layer of the resource specific build file; identifying at least one resource expectation from the read embedded metadata; and aggregating the at least one resource expectation to obtain the resource expectations.

Each of the resource expenditure estimates may indicate a quantity of consumed computing resources for hosting the container instance; and a financial cost for hosting the container instance.

Each of the performance attributes may indicate a time estimate for completing a workload of the workloads by hosting the container instance. The time estimate may be based on previously performed workloads (e.g., using an inference model or other function).

The computer-implemented method may also include obtaining a listing of available hardware resources for each of the deployments, wherein the one of the deployments is further selected using the listing of available hardware resources.

Selecting the one of the deployments may include calculating a score for each of the deployments using the object function; ranking the scores for the deployments to identify a best ranked deployment of the deployments; and using the best ranked deployment as the selected one of the deployments.

When calculating the score for each of the deployments, the objective function may take, for a respective deployment, as input: the resource expectations associated with the respective deployment; the available hardware resources associated with the respective deployment; the performance attributes associated with the respective deployment; and the resource expenditures estimates associated with the respective deployment.

The objective function may weight different portions of the input to prevent deployment of container instances to a portion of the deployments that are unable to support execution of the container instances. For example, an infinite weight may be used for certain hardware resources.

The objective function may weight different portions of the input to minimize cost for deployment of the container instance over performance of the container instance.

The computer-implemented method may further include obtaining a listing of data availability for each of the deployments, wherein the one of the deployments is further selected using the listing of data availability. The listing of data availability for each of the deployments indicates a cost for access, by respective deployments, to data necessary for execution of the container instance.

Deploying the container instance associated with the resource specific build file to the selected one of the deployments to service the workload request may include copying a container image associated with the resource specific build file to the selected one of the deployments; locating code associated with the copy of the container image into memory; and initiating execution of the code using operating system virtualization.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, one or more deployments 120, and a communication system 105 that facilitate operable connections between all, or a portion, of the components illustrated in FIG. 1. Each of these components is discussed below.

All, or a portion, of clients 102-104 may facilitate deployment of workloads thereby causing computer-implemented services to be provided. The computer implemented services may include any type and quantity of services including, for example, database services, instant messaging services, video conferencing services, etc.

To provide these services, one or more of clients 100 may obtain information (e.g., workload requests) regarding workloads to be performed. The information may be obtained, for example, from users of clients 100 or from other devices. Clients 100 may service the workload requests by facilitating deployment of the workloads to one or more of deployments 120.

In an embodiment, the workload requests are serviced by deploying container instances to deployments 120. For example, any of deployments 120 may be adapted to host instances of containers. To do so, deployments 120 may provide for operating system (OS) level virtualization. Container instances (e.g., user space instances) may be hosted and share the services provided by the virtualized operating system. The virtualized operating system may mediate presentation of and access to various resources of the host deployment. The applications and data in each of the hosted container instances may be segregated from one another and not be able to interact with one another.

To deploy an instance of a container, a build file may be utilized. The build file may specify any number of actions (e.g., layers) to be performed to obtain an image which may include all of the dependencies, libraries, and/or other data structures necessary for applications and other entities in the image to appropriately execute within a container instance. The image of the container may be used to deploy an instance of the container. For example, a copy of the contents of the image of the container may be stored (e.g., which may be stored in a read-only format) in the user space associated with the container instance. Additional, some amount of writable space may be available within the container instance which may be used to facilitate execution of applications, storage of changes to data (e.g., due to application execution) in the container instance over time, and/or used for other functions.

Various resources used to obtain copies of images may be obtained from various entities (e.g., local and/or remote). When a build file is used to obtain an image, any number of the resources (e.g., binary executables, dependencies, software libraries, configuration files, etc.) may be obtained and combined to obtain the image. For example, the build file may include any number of actions that when performed cause various resources to be obtained, aggregated, and/or otherwise processed to obtain a corresponding container image.

Deployments 120 may include any number of data processing devices that may be used to host container instances. As noted above, deployments 120 may host appropriate OS level virtualization services and/or other management entities such that any number of container instances may be deployed to deployments 120. Each of the deployments (e.g., 122, 124) may include any number of data processing devices that may independently or cooperatively host container instances.

However, any of deployments 120 may include different types and quantities of computing resources (e.g., processing resources, memory resources, persistent storage, communications resources, etc.) provided by hardware devices (e.g., processors, memory modules, storage devices, communications devices, special purpose devices such as graphics processing units, application specific integrated circuits, etc.). Thus, some deployments 120 may be better suited to performing different types of tasks.

Further, different types of container instances obtained using different container images may perform better on a particular deployment by virtue of the dependence of the respective container instances on various types and quantities of hardware resources. Thus, two different containers instances hosted by the same deployment may perform differently (e.g., even while performing a similar workload). For example, some container instances may perform better when executed by a particular type of processor and perform poorly when executed by other types of processors. The performance of various container instances may depend on the type and quantity of hardware resources available for performance of the container instances.

However, the dependence of container instances on the hardware available to the container instances may not be readily apparent. Build files, container images, and container instances may each respectively not include information indicating the dependence of corresponding container instances of the hardware resources available for performance. Thus, container instances may operate inefficiently if hosted by deployments that do not have corresponding hardware resources available for the container instances.

In general, embodiments disclosed herein relate to systems, methods, and devices for managing the deployment of workloads using containers instances. To manage the deployment of workloads, the computing resources dependence (e.g., resource expectations) of container instances may be taken into account when deciding how to service workload requests.

To decide how to service workload requests, various deployment locations may be evaluated to determine their relative levels of performance, cost, and/or other characteristics for a requested workload. To make the determination, an objection function may be used to obtain a score for any number of different deployment locations (e.g., different deployments). The scores provided by the objective function may indicate the relative value of each deployment location. The scores may be used to identify the location to which a container image will be deployed (e.g., the best scored location).

To identify the relative scores for various deployment locations for a workload, build files corresponding to the container instances may be enhanced (e.g., to obtain resource specific build files). The resource specific build files may directly indicate the computing resource dependence of each layer of the build file (e.g., which may be implemented with docker files). The computing resource dependence of each layer of a container may be aggregated to identify a resource expectation (e.g., the aggregate computing resources that are expected to be present for a corresponding container instance to perform as desired, expected, etc.) for the container instance. The resource expectations may be used as input to the objective function when calculating a score for a particular deployment location. The objective function may also take into account other information for a potential deployment location such as, for example, the relative cost (e.g., computational, financial) for obtaining access to data necessary for the workload at the potential deployment location, the available hardware resources of the potential deployment location, the potential attributes (e.g., performance metrics) to hosting the container instance at the potential deployment location, and/or other aspects of the potential deployment location that may be used to discriminate between different deployment locations.

To facilitate efficient evaluation of objective function, embedded metadata indicating the computing resource dependence of each layer may be added to build files obtain a resource specific build file (e.g., at generation time or other times). Thus, resource specific build files may indicate that some deployment locations may be better suited to hosting container instances than other deployment locations. In contrast, container instances (and container images) may be large in size and difficult to analyze for computing resource dependence.

By doing so, a system in accordance with embodiments disclosed herein may better marshal limited computing resources for performing workloads. For example, a system in accordance with embodiments disclosed herein may be more likely to deploy workloads to deployments that are better suited to host the workloads thereby improving the timeliness of completion of workloads, improving the efficiency of computing resource usage (e.g., by reducing the likelihood of deploying container instances to deployments that may inefficiently execute the container instances), and/or provide a higher workload capacity/higher workload throughput rate when compared with systems that rely on persons or other systems for workload deployment decisions.

Deployments 120 may perform workloads in cooperation with clients 100. To do so, deployments 120 may deploy instances of containers. Clients 100 may indicate when such containers instances are to be deployed and to where the container instances are to be deployed. To facilitate deployment location selection, deployments 120 may provide information to clients 100 regarding the characteristics of deployments 120. The information may include, for example, (i) listing of available hardware resources (e.g., processors, memory modules, storage modules, etc.), (ii) performance metrics (e.g., processing cycle rates, storage cycle rates, storage space, etc.), (iii) data access cost (e.g., computational and/or financial costs for facilitating access to certain data which may be necessary to perform certain workloads), and/or (iv) cost information (e.g., which may be specified using any type of metrics) for performing workloads. For example, any of deployments 120 may be private infrastructure and/or public infrastructure that may be usable by any of clients 100 with correspond cost structure for such use.

Any of clients 100 and deployments 120 may be implemented using a data processing systems (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 7. For additional details regarding clients 100, refer to FIG. 2A.

In an embodiment, communication system 105 includes one or more networks that facilitate communication between all, or a portion, of clients 100 and deployments 120. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployments 120 may be operably connected to one another via a second local network which is also operably connected to the Internet thereby allowing any of clients 100 and deployments 120 to communication with one another and/or other devices operably connected to the Internet. Clients 100, deployments 120, and/or communication system 105 may be adapted to perform one or more protocols for communicating via communication system 105.

While illustrated in FIG. 1 as included a limited number of specific components, a system in accordance with an embodiment may include fewer, additional, and/or different components than those illustrated therein.

Figure 2A:
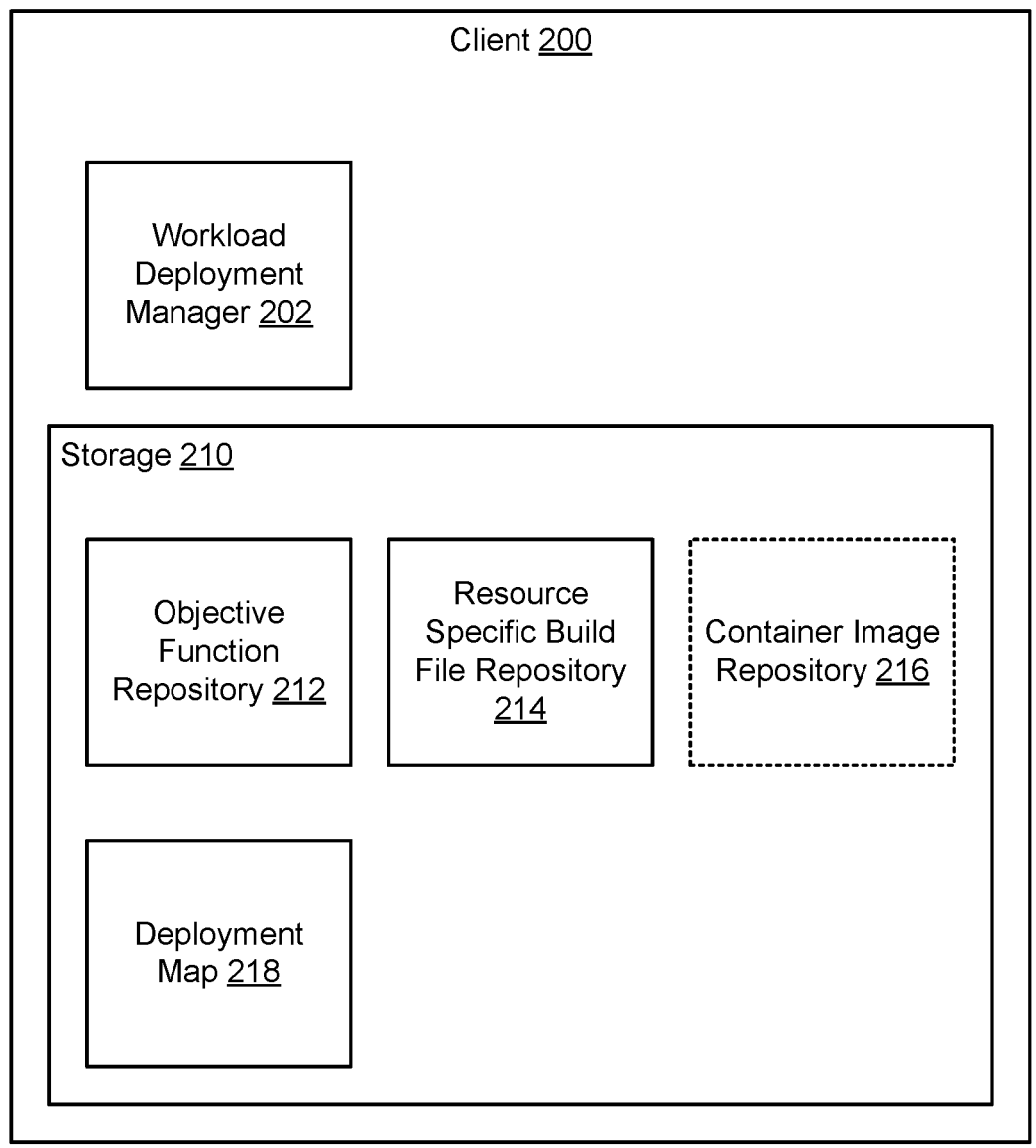
FIG. 2A shows a block diagram illustrating a client in accordance with an embodiment.

Turning to FIG. 2A, a diagram of an example client 200 in accordance with an embodiment is shown. Client 200 may be similar to any of clients 100 shown in FIG. 1. As discussed above, client 200 may facilitate the deployment of workloads based on embedded metadata in build files (e.g., resources specific build files) and characteristics of various deployments. To provide the aforementioned functionality, client 200 may include workload deployment manager 202 and storage 210. Each of these components is discussed below.

Workload deployment manager 202 may facilitate deployments of workloads. To do so, workload deployment manager 202 may (i) obtain workload requests for workloads, (ii) obtain resource expectations for the workloads from corresponding resource specific build files, (iii) identify deployment locations for the workloads, (iv) identify characteristics of the workload locations (e.g., computational resources, costs for use, etc.), (v) use an objective function to rank the deployment locations with respect to one another using the resource expectations and the characteristics of the workload locations, and (vii) deploy container instances to the best ranked deployment locations. By doing so, containers instances may more likely to be deployed to deployments that are better able to host the container instances. Consequently, workloads may be performed more quickly, at higher efficiency, and/or may free limited computing resources for other purposes.

In an embodiment, the resource specific build files are implemented using docker files that include embedded metadata that defines the resource expectations for each level of the docker file. The docker files may include any number of layers. The resource specific build files may be stored in (or referenced by) resource specific build file repository 214.

Figure 2B:
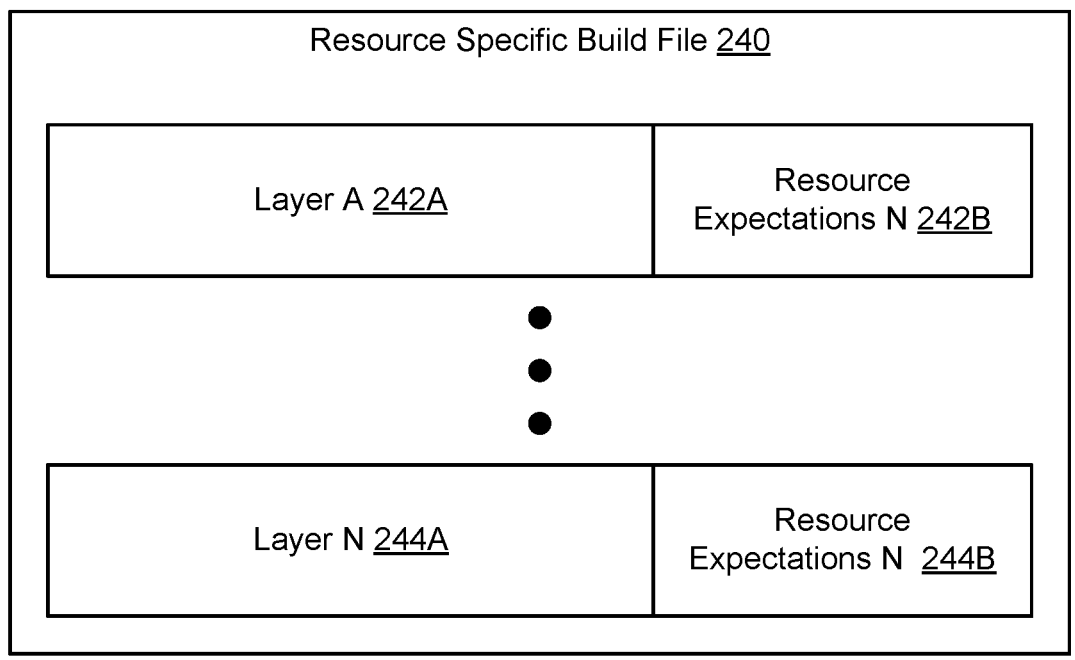
FIG. 2B shows a block diagram illustrating a resource specific build file in accordance with an embodiment.

The resource specific build files may include embedded metadata indicating how corresponding containers instances are likely to perform when instantiated on deployments with different types of hardware resources. This information may be used by workload deployment manager 202 to select on which deployment to instantiate a container instance to service a workload request. Refer to FIG. 2B for additional information regarding resource specific build files.

Figure 3:
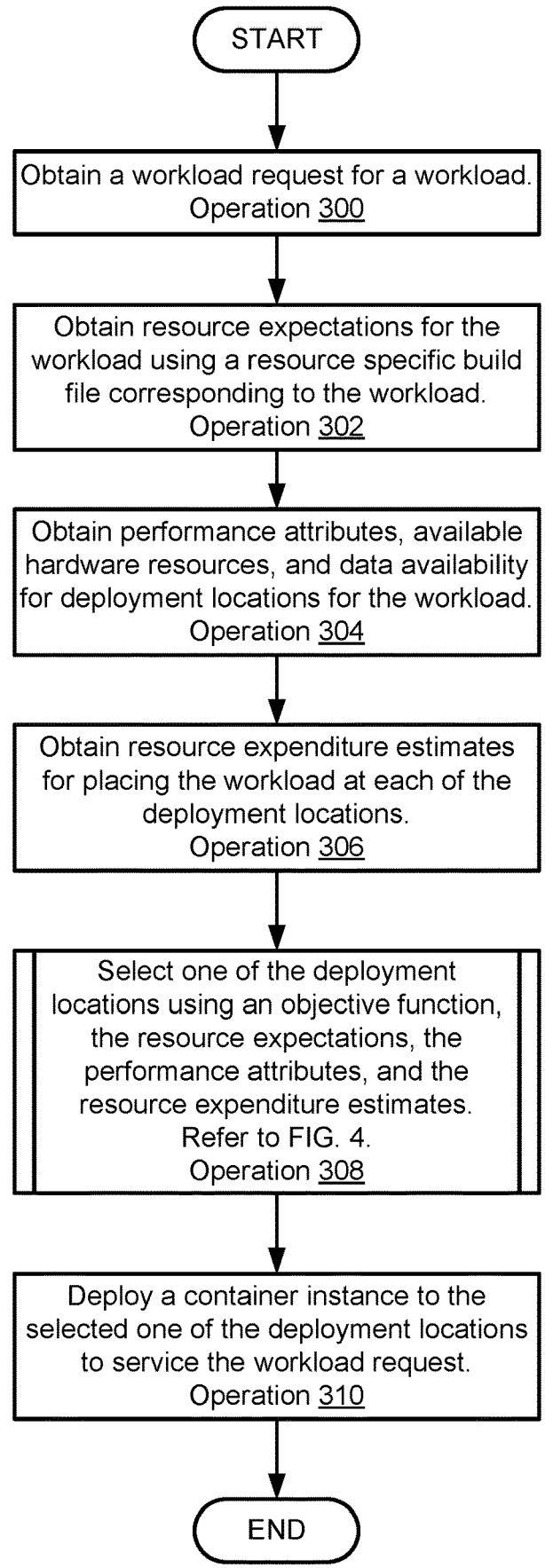
FIG. 3 shows a flow diagram illustrating a method of deploying container instances to service workload requests in accordance with an embodiment.
Figure 4:
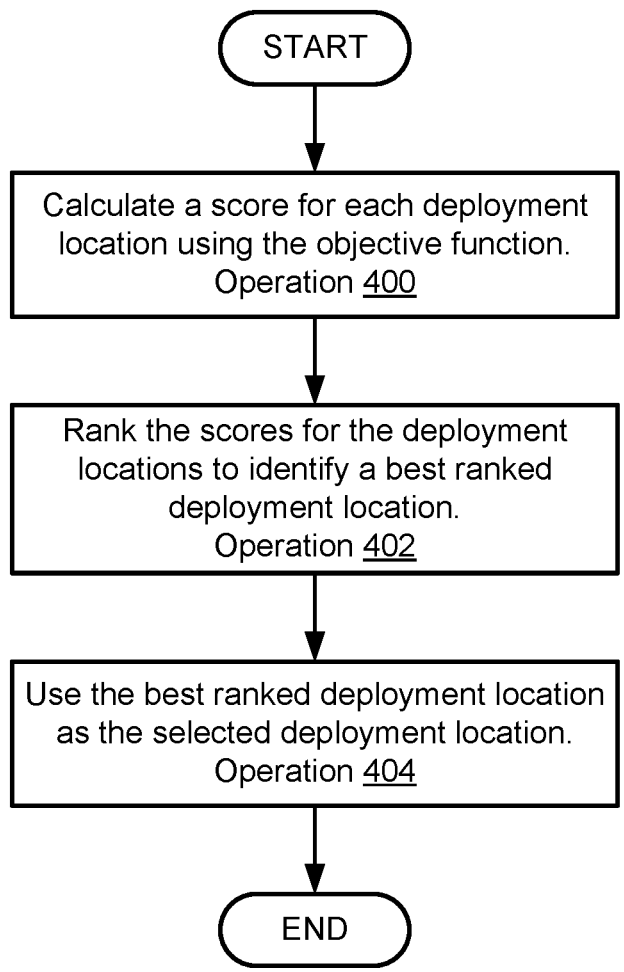
FIG. 4 is a flow diagram illustrating a method of determining deployment locations for container instances in accordance with an embodiment.
Figure 5A:
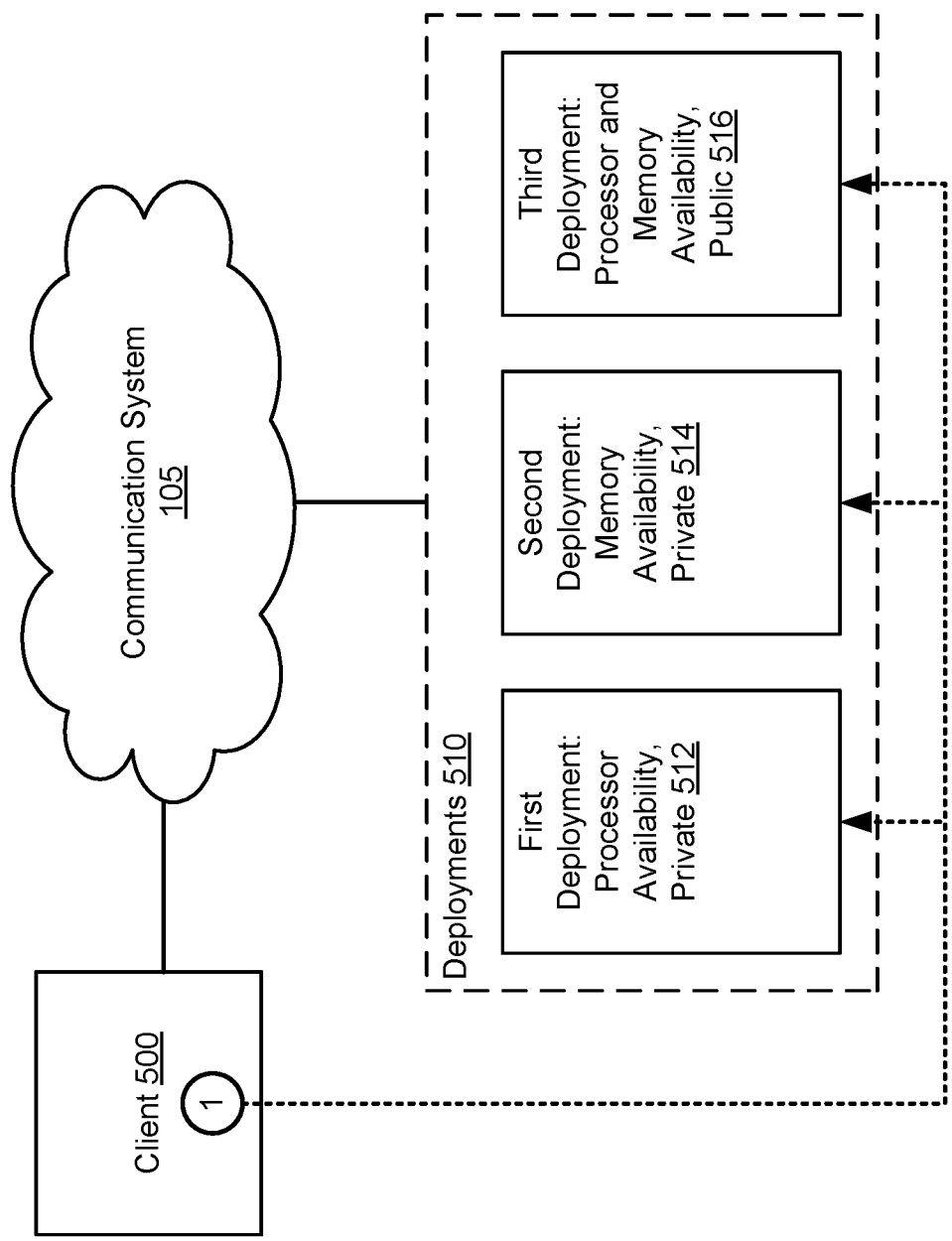
FIGS. 5A-5C show diagrams illustrating example operations performed by an example system over time in accordance with an embodiment.
Figure 5B:
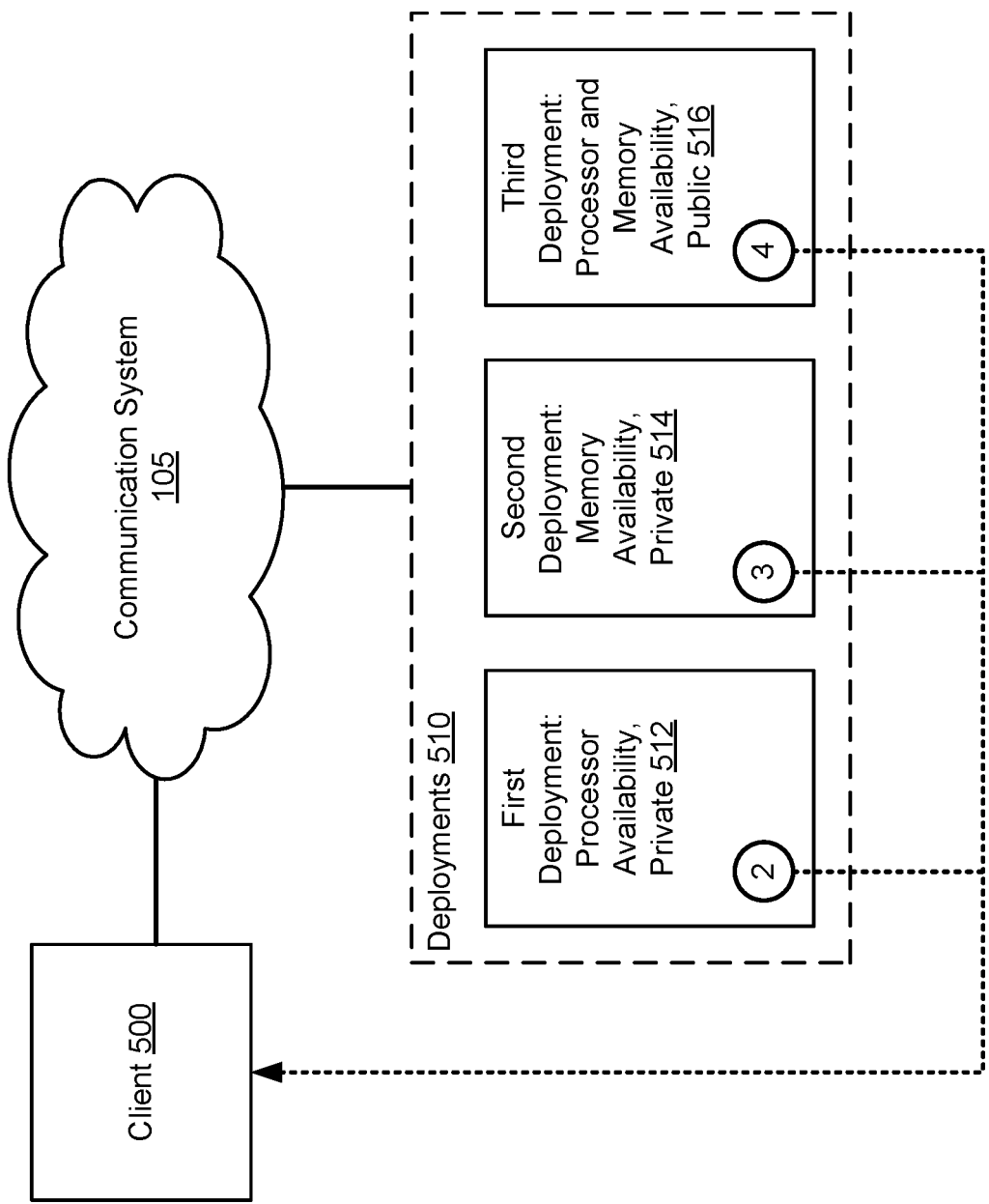
Figure 5C:
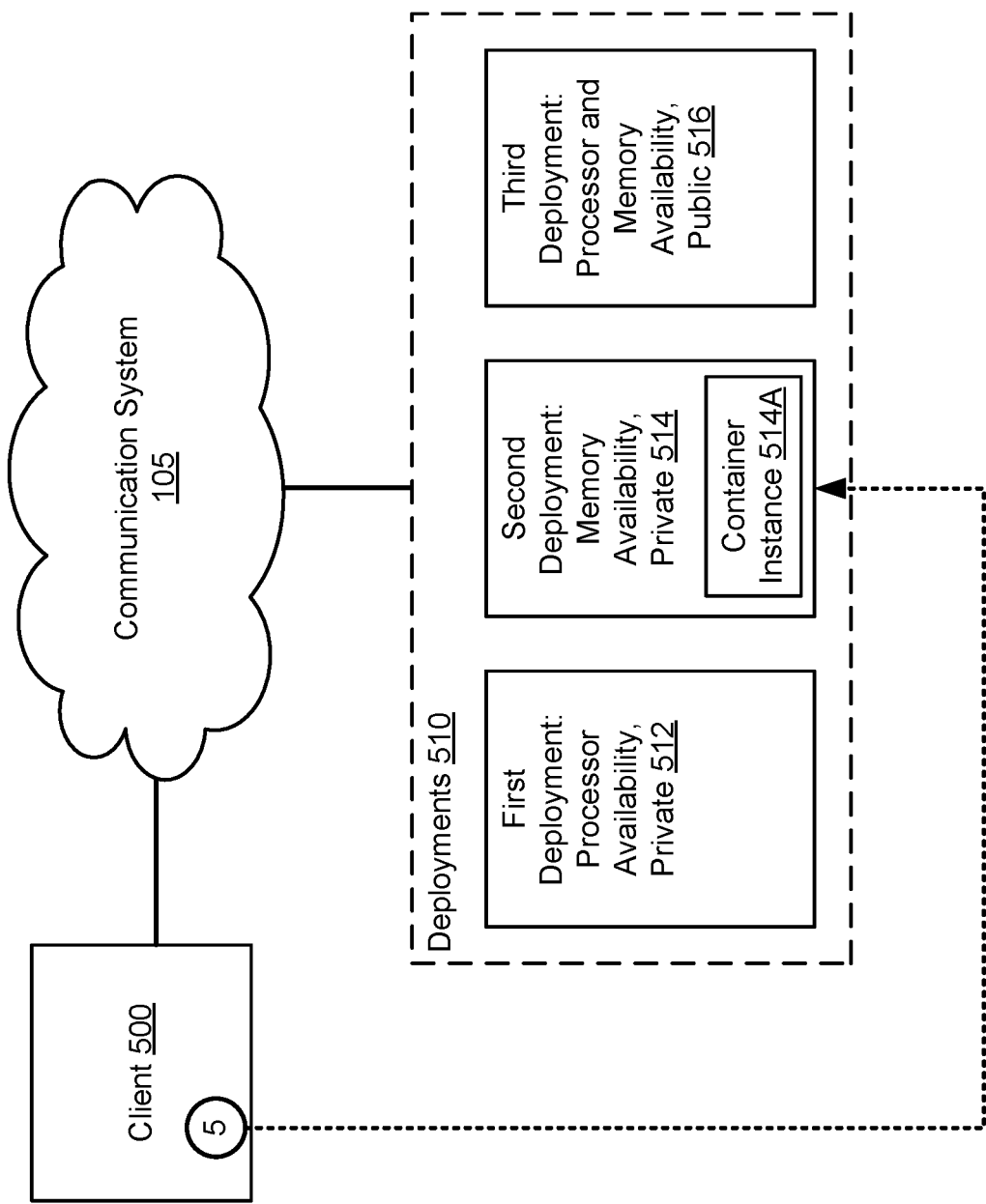
Figure 6:
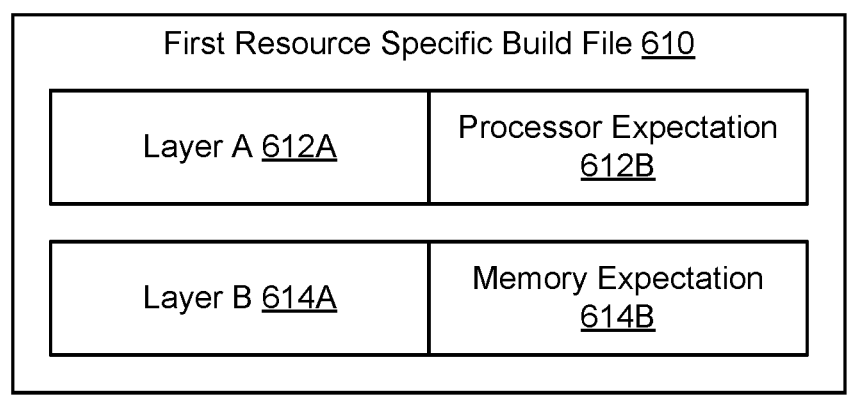
FIG. 6 shows a diagram illustrating an example data structure used by an example system in accordance with an embodiment.

When providing their functionalities, workload deployment manager 202 may perform all, or a portion, of the methods illustrated in FIGS. 3-4 and/or the operations and actions illustrated in FIGS. 5A-6.

In an embodiment, workload deployment manager 202 is implemented using a hardware device including circuitry. The hardware device may be, for example, a digital signal processor, a field programmable gate array, or an application specific integrated circuit. The circuitry may be adapted to cause the hardware device to perform the functionality of workload deployment manager 202. Workload deployment manager 202 may be implemented using other types of hardware devices without departing from embodiments disclosed herein.

In an embodiment, workload deployment manager 202 is implemented using a processor adapted to execute computing code stored on a persistent storage that when executed by the processor performs the functionality of workload deployment manager 202 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including objective function repository 212, resource specific build file repository 214, container image repository 216 (drawn in FIG. 2A with a dashed outline to emphasize that client 200 may not include container image repository 216, like any other data structure illustrated in FIG. 2A), and deployment resource map 218. Each of these data structures is discussed below.

Objective function repository 212 may include one or more data structures that include information regarding objective functions usable to score, rank, and/or otherwise compare potential deployment locations to one another. For example, objective function repository 212 may include any number of objective functions (e.g., as separate, discrete data structures). Each objective function may be associated with corresponding workloads. When workload request for a workload is obtained, the type of the workload may be used to identify a corresponding objective function with objective function repository 212.

One or more of the objective functions may take, as input, (i) resource expectations (e.g., specific by a resource specific build file associated with the workload), (ii) available hardware resources of a deployment, (iii) performance metrics of the deployment, (iv) costs (e.g., computational and/or financial) for accessing, by the deployment, data necessary for performance of the workload, and/or (v) costs (e.g., financial) for performing the workload with the deployment. The one or more objective functions may output a value corresponding to a score for the deployment. For example, the objective function may have a form of $f((i), (ii), (iii), (iv), (v))=A*(i)+B*(ii)+C*(iii)+D*(iv)+E*(v)$ where A-E are constants. Different objective functions may have different forms and may have different values for A-E (e.g., weights). Thus, different objective functions may output different values for the same deployment location.

Resource specific build file repository 214 may include one or more data structures that include information regarding resource specific build files. For example, resource specific build file repository 214 may include any number of build files (e.g., as separate, discrete files) that include embedded metadata which specifies hardware dependencies (and/or requirements which may result in a corresponding container instance not properly working if the requirements are not met), preferences, performance levels of the corresponding layers on various types of hardware, and/or other types of information (e.g., collectively referred to as "resource expectations") which may be used to ascertain how a corresponding container instance may perform when deployed to a particular location. Each build file may include any number of layers. The embedded metadata may be correlated with the layers of each build file.

In an embodiment, the embedded metadata is added as build files are created. For example, when a build file is created and a corresponding container image is generated, the corresponding container image (and layers thereof) may be analyzed to identify its resource expectations. Metadata for the corresponding layers may be generated and added to the build files to obtain resource specific build files (e.g., build files that indicate their resource expectations). The analysis may be performed via any method such as, for example, heuristic analysis, hand analysis (e.g., a person may identify the resources preferences for each layer), automated scoring (e.g., by running corresponding container instances on different deployments with different hardware resource profiles) for different hardware resource conditions, performing lookups using third party data sources (e.g., some build files may be built on top of existing build files provided by specific hardware vendors, the provider of the based build files may be presumed to have optimized the build files for the third party's hardware), etc.

In an embodiment, the embedded metadata includes authentication data which may be used by client 200 to determine whether to trust or otherwise utilize the resources specific build files, or layers thereof. For example, the authentication data may be used by client 200 to ascertain whether a trusted entity generated the resource specific build file, build file on which the resource specific build file is based, or portion thereof.

The resource specific build files may be usable to generate container images. A container image may be a data structure that may be (at least partially) loaded in memory and initiated to execute (e.g., as a container instance). The container images may use a virtualized operating system on a host system to facilitate its execution. For example, a container instance may include a container engine, system libraries, any number of utility, configuration settings, and specific applications that may perform corresponding workloads. The container instance may not include an operating system (e.g., it may utilize the virtualized operating system presented to it by an abstraction layer hosted by a host system that presents the virtualized operating system to any number of container instances). The resource specific build files may also specify the addition of a read/writable space for container images (e.g., while the other layers of the container instances may be immutable). The read/writable space may facilitate operation of the immutable layers by allowing for data to be stored, changes to be recorded, etc.

Container image repository 216 may include one or more data structures that include information regarding container images corresponding to the resource specific build files in resource specific build file repository 214. For example, container image repository 216 may include copies of container images corresponding to the resource specific build files of resource specific build file repository. Other entities may host copies of all, or a portion, of container image repository 216. For example, deployments may host (or be operably connected to other data processing systems that host) copies of all, or a portion, of container image repository 216 thereby facilitating efficient deployment of container instances.

While objective function repository 212, resource specific build file repository 214, and container image repository 216 have been described as including objective function, resource specific build files, or container images, any of these repositories may include, in part or entirely, reference information for various objective functions, resource specific build files, and/or container images. For example, the reference information may be usable to download the objective functions, resource specific build files, and/or container images from other entities.

Deployment resource map 218 may include one or more data structures that include information regarding deployments to which workloads may be deployed. For example, deployment resource map 218 may indicate (i) the total hardware resources (regardless of whether in use), (ii) the available hardware resources available, (iii) various performance metrics for the deployments (e.g., processing rates, storage rates, etc.) (iv) costs (e.g., computational such as network bandwidth and/or financial such as cost for data transit) for providing access to data at a deployment to perform a workload, and/or (v) cost (e.g., financial such as for using public infrastructure) for performing a workload various deployments (and/or cost rates). The deployment map may be utilized to select where to deploy container instances (e.g., based on rankings of the deployments using an objective function).

While various data structures have been illustrated and described in FIG. 2A with specific structures, any of the data structures may be implemented with various types of structures (e.g., lists, tables, linked lists, databases, etc.), stored in different locations, may include different/less/more information than described above, and/or spanned across any number of devices without departing from embodiments disclosed herein.

While illustrated in FIG. 2A with a limited number of specific components, a client may include additional, fewer, and/or different components without departing from embodiments disclosed herein.

As discussed above, build files may be enhanced with embedded metadata to obtain resource specific build files. Turning to FIG. 2B, an example resource specific build file 240 in accordance with an embodiment is shown. Resource specific build file 240 may include embedded metadata. Consequently, it may be possible to efficiently identify how a container instance based on build file 230 will perform when executed by any particular data processing system. For example, resource specific build file 240 may include any number of layers 242A, 244A that each specify actions to be performed to obtain a container image corresponding to resource specific build file 240. The actions may include, for example, adding various types of information to a data structure. The information may be obtained from a range of locations that may be local (e.g., stored in a local storage device) or may be stored remotely. For example, the information may include executable files, configurations, and/or other types of information that may be combined to obtain a container image.

Any of layers 242A, 244A may have some degree of hardware dependence. The aggregate hardware dependence of layers 242A, 244A may be the resource expectations for the resource specific build file 240. Resource specific build file 240 may include any quantity of embedded metadata (e.g., 242B, 244B). The embedded metadata may specify resource expectations 242B, 244B for each of layers 242A, 244A. Consequently, the likely performance of a container instance based on resource specific build file 240 may be apparent from resource specific build file 240.

In an embodiment, when a layer has a resource expectation, the resource expectations 242B, 244B indicate a class of a hardware device (e.g., a model); a type of a hardware device (processor, memory device); and/or a manufacturer of a hardware device. For example, resource expectations 242B, 244B may include one or more identifiers corresponding to the class, type, and/or manufacturer.

While resource expectations 242B, 244B are illustrated as being interleaved with layers 242A, 244A, layers 242A, 244A and resource expectations 242B, 244B may be arranged differently (e.g., segregated from each other) without departing from embodiments disclosed herein.

However, in an embodiment, resource expectations 242B, 244B are interleaved with layers 242A, 244A to indicate correspondence between the layers and resource expectations. Thus, additional metadata defining correspondence between the layers and resource expectations may not need to be utilized thereby reducing the size of resource specific build files.

A client may include or otherwise utilize any number of resource specific build files as illustrated in FIG. 2C.

While various data structures have been illustrated and described in FIGS. 2A-2B with specific structures, any of the data structures may be implemented with different structures (e.g., lists, tables, linked lists, databases, etc.), stored in different locations, may include less/additional/different information than that discussed herein, and/or spanned across any number of devices without departing from embodiments disclosed herein.

As discussed above, the components of FIG. 1 may perform various methods to service workload performance requests. FIGS. 3-4 illustrates examples of methods that may be performed by the components of FIG. 1. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of obtaining a resource specific build file in accordance with an embodiment is shown. The method may be performed by a client or another entity.

At operation 300, a workload request for a workload is obtained. The workload request may be obtained, for example, from another device via a message (or other type of communication), from a user of the client (e.g., through a workload deployment interface), or via another method. The workload request may specify, for example, the type of the workload to be performed (e.g., via an identifier).

At operation 302, resource expectations for the workload are obtained using a resource specific build file corresponding to the workload. The resource expectations may be obtained by reading resource expectations from layer-level metadata embedded in the resource specific build file. The layer-level metadata may specify the resource expectations for each layer. The resource expectations from each layer may be aggregated to obtain the resource expectations for the workload (e.g., the union of the resource expectations from the layer-level resource expectations).

At operation 304, performance attributes, available hardware resources, and/or data availability for deployment locations for the workload are obtained. The performance attributes, available hardware resources, and/or data availability may be obtained by requesting them from the deployment locations (e.g., different deployments). The performance attributes may include any number of performance metrics which may be used to estimate how quickly a workload will be performed. The hardware resources may indicate whether a deployment has available hardware components necessary to perform the workload. The data availability may indicate whether data necessary to perform a workload is locally available and/or a cost for making the data necessary to perform the workload locally available (e.g., via network transit).

As part of the request, the client may specify actions to be performed by the deployments to obtain the performance attributes, available hardware resources, and/or data availability. For example, the client may specify performance of test workloads or other actions which may be used to estimate each of these parameters for a to-be-performed workload.

At operation 306, resource expenditure estimates for placing the workload at each of the deployment locations are obtained. The resource expenditure estimates may be obtained from previously performed workloads that are similar to the to-be-performed workload. For example, when a workload is performed, its resource expenditure may be measured. The resource expenditures from any number of workloads may be used to obtain an inference model, fit a function, or otherwise generate a model for estimating resource expenditures for any number of workloads. The model may be used to obtain the resource expenditure estimates for placing the workload at each of the deployment locations.

At operation 308, one of the deployment locations is selected using an objective function, the resource expectations, the performance attributes, and the resource expenditure estimates. The available hardware resources and/or data availability for each deployment location may also be used.

For example, the objective function may take, as input, the resource expectations, the performance attributes, the resource expenditure estimates, available hardware resources, and/or data availability for a deployment location as input and output a value indicating the relative desirability of placing the workload at the deployment. Each of the deployment locations may be ranked using the output values. The best ranked deployment (e.g., highest or lowest value, depending on the objective function) may be selected as the one of the deployment locations.

In an embodiment, the one of the deployment locations is selected via the method illustrated in FIG. 4. The one of the deployment locations may be selected via other methods without departing from embodiments disclosed herein.

At operation 310, a container instance is deployed to the one of the deployment locations to service the workload request. The container instance may be associated with the resource specific build file (e.g., may be obtained using a container image generated or based on the resource specific build file).

To deploy the container instance, the client may instruct the one of the deployment locations to deploy the container instance. The one of the deployment locations may then deploy the container instance by instantiating the corresponding user space, populating it with corresponding data, loading instructions into memory, and/or initiating execution of the instructions to begin execution of the container instance.

The method may end following operation 310.

Turning to FIG. 4, a flow diagram illustrating a method of selecting a deployment location in accordance with an embodiment is shown. The method may be performed by a client or another entity.

At operation 400, a score for each deployment location may be calculated using an objective function. The objective function may be selected from the objective function repository. For example, a type of the workload may be used to discriminate the selected objective function from other objective functions in the objective function repository.

The score for each deployment location may be calculated, as discussed above, by providing the input to the objective function. The objective function may output the score for the deployment. Any number of deployment locations may be scored in this manner.

At operation 402, the scores for the deployments are ranked to identify a best ranked deployment location. The scores may be ranked based on the objective function. For example, each objective function may indicate whether higher or lower scores correspond to better scores. Thus, the scores may be ordered (e.g., numerically highest to lowest or lowest to highest) and the deployment location associated with the highest or lowest score may be selected identified as the best ranked deployment location.

At operation 404, the best ranked deployment location is used as the selected one of the deployments. In other words, the best ranked deployment location may be selected for deployment of a container image to service the workload request.

The method may end following operation 404.

Using the methods illustrated in FIGS. 3-4, embodiments disclosed herein may facilitate deployment of container instances better matched to computing environments in which they will execute. By doing so, the resulting performance of the container instances may be improved thereby allowing for larger numbers of workloads to be serviced. Consequently, embodiments disclosed herein may provide an improved data processing system that more efficiently allocates resources for servicing workloads.

To further clarify embodiments disclosed herein, FIGS. 5A-5C show diagrams in accordance with an embodiment disclosed herein illustrating example operation of a system similar to that shown in FIG. 1 over time. FIG. 6 illustrate a diagram in accordance with an embodiment disclosed herein of an example data structure that may be utilized by components of the system illustrated in FIGS. 5A-5C.

Turning to FIG. 5A, consider an example scenario where client 500 is operably connected to deployments 510 via communication system 105. First deployment 512 may have processor availability, second deployment 512 may have memory availability, and third deployment 516 may have both processor and memory availability. First and second deployments 512, 514 may be private infrastructure while third deployment may be public infrastructure thereby resulting in incremental cost for performing workloads on third deployment 516 on behalf of client 500 whereas incremental cost is not accrued for performing workloads with first deployment 512 and second deployment 514.

Turning to FIG. 6, client 500 may host a resource specific build file 610 that is associated with a workload. In other words, when a request for a workload is obtained, it may be serviced using the resource specific build file 610 by instantiating a container instance based on it (or more specifically, based on a container image generated with resource specific build file 610). Resource specific build file 610 may include two layers. The layers 612A, 614A of resource specific build file 610 may include a processor expectation 612B and a memory expectation 614B. Thus, in aggregate, first resource specific build file 610 includes both processor and memory resource expectations.

Returning to FIGS. 5A-5C, actions performed by various components of the system are illustrated. Operations performed by components are illustrated using numbered circles and interactions between components (e.g., data/information transmission) are illustrated using arrows with dashed tails.

Turning to FIG. 5A, at block 1, client 500 sends requests for information regarding each of the deployments so that client 500 is ready to make workload deployment decisions. Similar information (e.g., available hardware resources, performance metrics, data availability, cost information, etc.) may be requested from each of the deployments.

Turning to FIG. 5B, at block 2, first deployment 512 indicates that it has processor availability and does not have any incremental cost for workload deployment. At block 3, second deployment 514 indicates that it has memory availability and does not have any incremental cost for workload deployment. At block 4, third deployment 516 indicates that it has processor availability, memory availability, and incremental cost for workload deployment.

Turning to FIG. 5C, client 500, at block 5, obtains a workload request for the workload associated with resource specific build file shown in FIG. 6. Client 500 also retrieves the following objective function F(processor availability, memory availability, incremental cost)=10*processor availability+14*memory availability−15*incremental cost with higher values being better and the presence or lack of the availability/cost being treated as a binary "1" or "0". To decide where to deploy a container instance, client 500 calculates a value for each of the deployments using the objective function. For first deployment 512, client 500 calculates the function as $10*(1)+14*(0)-15*(0)=10$. For second deployment 514, client 500 calculates the function as $10*(0)+14*(1)-15*(0)=14$. For third deployment 516, client 500 calculates the function as $10*(1)+14*(1)-15*(1)=9$.

Based on these values, client 500 identifies that second deployment 514 is ranked the best. Consequently, client 500 determines that a container instance is to be deployed to second deployment and sends appropriate instructions to second deployment.

In response to the instructions, second deployment deploys container instance 514A based on the resource specific build file (e.g., using a container instance generated using the resource specific build file shown in FIG. 6).

Consequently, a container instance to service the workload request may be automatically deployed without requiring that user of client 500 specify a deployment location where the workload be serviced. By doing so, the distributed system of FIG. 5C may automatically ascertain where to deploy the container instance.

Figure 7:
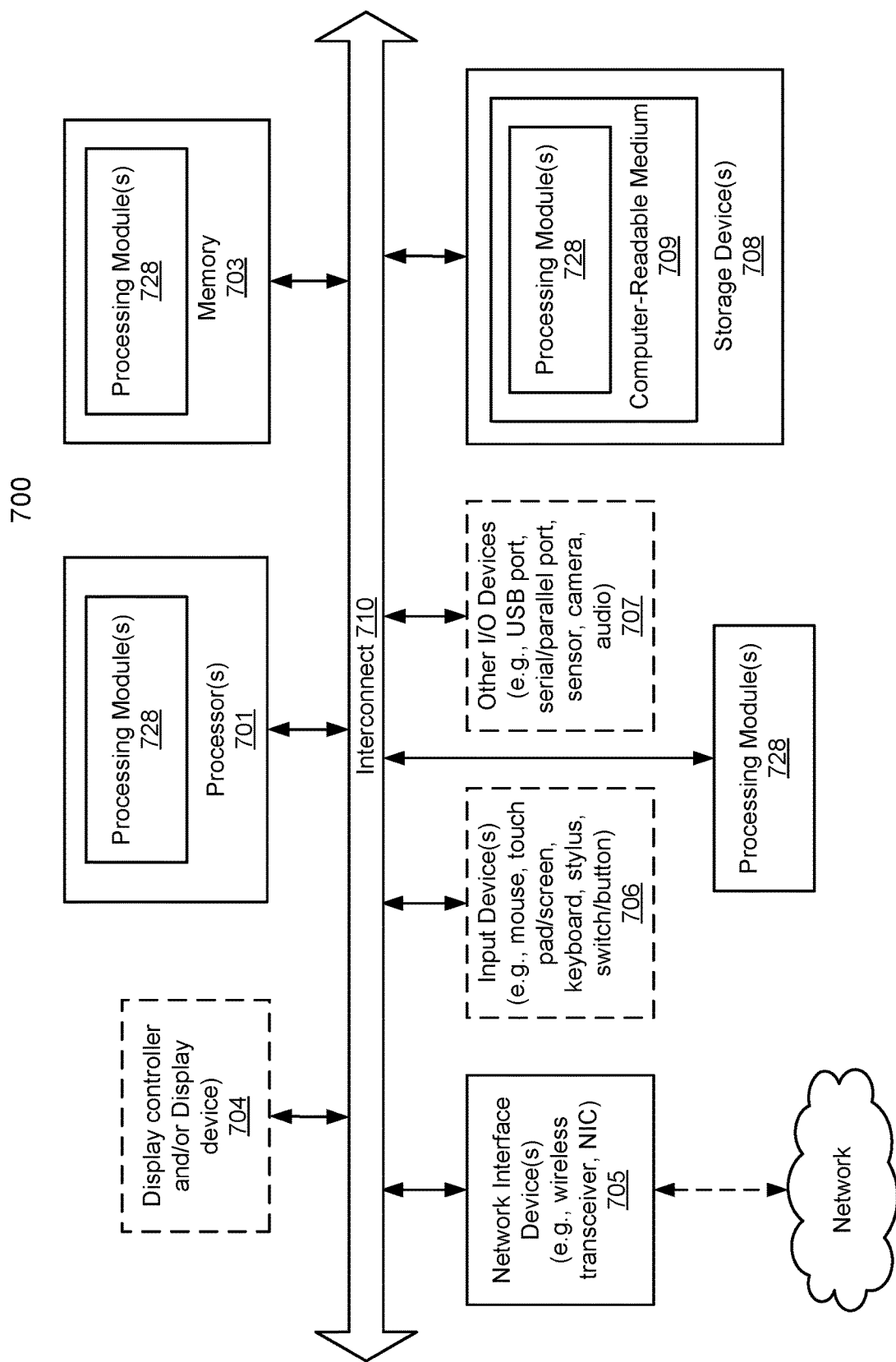
FIG. 7 shows a block diagram illustrating a data processing system in accordance with an embodiment.

Any of the components illustrated in FIGS. 1-6 may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing workloads to be performed using deployments, the method comprising:

obtaining a new workload request for a workload to be performed with a data processing system of the deployments;

identifying, within a resource specific build file repository, a resource specific build file corresponding to the workload and obtaining the resource specific build file from the resource specific build file repository;

obtaining resource expectations for the workload using the resource specific build file;

obtaining performance attributes for each of the deployments;

obtaining resource expenditure estimates for placing the workload at each of the deployments;

selecting one of the deployments using an objective function, the resource expectations, the performance attributes, and the resource expenditures estimates; and deploying the container instance associated with the resource specific build file to the selected one of the deployments to service the workload request, the container instance being obtained using a container image that is generated based on the resource specific build file, the container image and the resource specific build file being two separate files.

2. The computer-implemented method of claim 1, wherein obtaining the resource expectations for the workload using the resource specific build file corresponding to the workload comprises:
   reading embedded metadata corresponding to each layer of the resource specific build file;
   identifying at least one resource expectation from the read embedded metadata; and
   aggregating the at least one resource expectation to obtain the resource expectations.

3. The computer-implemented method of claim 1, wherein each of the resource expenditure estimates indicates:
   a quantity of consumed computing resources for hosting the container instance; and
   a financial cost for hosting the container instance.

4. The computer-implemented method of claim 3, wherein each of the performance attributes indicates:
   a time estimate for completing a workload of the workloads by hosting the container instance.

5. The computer-implemented method of claim 4, further comprising:
   obtaining a listing of available hardware resources for each of the deployments,
   wherein the one of the deployments is further selected using the listing of available hardware resources.

6. The computer-implemented method of claim 5, wherein selecting the one of the deployments comprises:
   calculating a score for each of the deployments using the object function;
   ranking the scores for the deployments to identify a best ranked deployment of the deployments; and
   using the best ranked deployment as the selected one of the deployments.

7. The computer-implemented method of claim 6, wherein when calculating the score for each of the deployments, the objective function takes, for a respective deployment, as input:
   the resource expectations associated with the respective deployment;
   the available hardware resources associated with the respective deployment;
   the performance attributes associated with the respective deployment; and
   the resource expenditures estimates associated with the respective deployment.

8. The computer-implemented method of claim 7, wherein the objective function weights different portions of the input to prevent deployment of container instances to a portion of the deployments that are unable to support execution of the container instances.

9. The computer-implemented method of claim 7, wherein the objective function weights different portions of the input to minimize cost for deployment of the container instance over performance of the container instance.

10. The computer-implemented method of claim 4, further comprising:
    obtaining a listing of data availability for each of the deployments,
    wherein the one of the deployments is further selected using the listing of data availability.

11. The computer-implemented method of claim 1, wherein deploying the container instance associated with the resource specific build file to the selected one of the deployments to service the workload request comprises:
    copying the container image to the selected one of the deployments;
    locating code associated with the copy of the container image into memory; and
    initiating execution of the code using operating system virtualization.

12. The computer-implemented method of claim 1, wherein the resource specific build file comprises embedded metadata comprising authentication data indicating whether the resource specific build file can be trusted by a data processing system that will use the resource specific build file to obtain the resource expectations for the workload.

13. The computer-implemented method of claim 1, wherein the resource specific build files comprise embedded metadata and is generated by:
    generating an initial build file without the embedded metadata and a corresponding container image, the corresponding container image being identical to the container image used to obtain the container instance;
    analyzing the corresponding container image generated with the initial build file to identify resource expectations indicated in the corresponding container image;
    generating metadata based on the resource expectations indicated in the corresponding container image; and
    embedding the metadata as the embedded metadata into the initial build file to obtain the resource specific build file.

14. The computer-implemented method of claim 1, wherein the container image is larger in size than the resource specific build file.

15. A non-transitory machine-readable medium having instructions stored therein, which when executed by a processor, cause the processor to perform operations for managing workloads to be performed using deployments, the operations comprising:
    obtaining a new workload request for a workload to be performed with a data processing system of the deployments;
    identifying, within a resource specific build file repository, a resource specific build file corresponding to the workload and obtaining the resource specific build file from the resource specific build file repository;
    obtaining resource expectations for the workload using the resource specific build file;
    obtaining performance attributes for each of the deployments;
    obtaining resource expenditure estimates for placing the workload at each of the deployments;
    selecting one of the deployments using an objective function, the resource expectations, the performance attributes, and the resource expenditures estimates; and
    deploying a container instance associated with the resource specific build file to the selected one of the deployments to service the workload request, the container instance being obtained using a container image that is generated based on the resource specific build file, the container image and the resource specific build file being two separate files.

16. The non-transitory machine-readable medium of claim 15, wherein obtaining the resource expectations for the workload using the resource specific build file corresponding to the workload comprises:

reading embedded metadata corresponding to each layer of the resource specific build file;

identifying at least one resource expectation from the read embedded metadata; and aggregating the at least one resource expectation to obtain the resource expectations.

17. The non-transitory machine-readable medium of claim 15, wherein each of the resource expenditure estimates indicates:

a quantity of consumed computing resources for hosting the container instance; and a financial cost for hosting the container instance.

18. A data processing device, comprising:

a processor; and a memory coupled to the processor to store instructions, which when executed by the processor, cause the processor to perform operations for managing workloads to be performed using deployments, the operations comprising:

obtaining a new workload request for a workload to be performed with a data processing system of the deployments;

identifying, within a resource specific build file repository stored in the memory, a resource specific build file corresponding to the workload and obtaining the resource specific build file from the resource specific build file repository;

obtaining resource expectations for the workload using the resource specific build file;

obtaining performance attributes for each of the deployments;

obtaining resource expenditure estimates for placing the workload at each of the deployments;

selecting one of the deployments using an objective function, the resource expectations, the performance attributes, and the resource expenditures estimates; and deploying a container instance associated with the resource specific build file to the selected one of the deployments to service the workload request, the container instance being obtained using a container image that is generated based on the resource specific build file, the container image and the resource specific build file being two separate files.

19. The data processing device of claim 18, wherein obtaining the resource expectations for the workload using the resource specific build file corresponding to the workload comprises:

reading embedded metadata corresponding to each layer of the resource specific build file;

identifying at least one resource expectation from the read embedded metadata; and aggregating the at least one resource expectation to obtain the resource expectations.

20. The data processing device of claim 18, wherein each of the resource expenditure estimates indicates:

a quantity of consumed computing resources for hosting the container instance; and a financial cost for hosting the container instance.

* * * * *